United States Patent
Amit et al.

(10) Patent No.: US 8,813,237 B2
(45) Date of Patent: Aug. 19, 2014

(54) THWARTING CROSS-SITE REQUEST FORGERY (CSRF) AND CLICKJACKING ATTACKS

(75) Inventors: Yair Amit, Tel-Aviv (IL); Roee Hay, Haifa (IL); Roi Saltzman, Rishon le Zion (IL); Adi Sharabani, Ramat Gan (IL)

(73) Assignee: International Business Machines Corporation, Armonk, NY (US)

( * ) Notice: Subject to any disclaimer, the term of this patent is extended or adjusted under 35 U.S.C. 154(b) by 515 days.

(21) Appl. No.: 12/825,290

(22) Filed: Jun. 28, 2010

(65) Prior Publication Data
US 2011/0321168 A1    Dec. 29, 2011

(51) Int. Cl.
*G06F 21/00* (2013.01)

(52) U.S. Cl.
USPC .......... 726/26; 726/27; 726/5; 726/1; 726/23; 726/9; 713/155; 713/159; 713/170; 713/172; 709/223; 709/229; 709/232

(58) Field of Classification Search
USPC .............. 726/13, 1–10, 26–30; 709/229, 223, 709/232; 713/155, 159, 170, 172
See application file for complete search history.

(56) References Cited

U.S. PATENT DOCUMENTS

| | | | |
|---|---|---|---|
| 6,970,933 B1 * | 11/2005 | Masters | 709/229 |
| 7,373,524 B2 | 5/2008 | Motsinger et al. | |
| 7,478,434 B1 | 1/2009 | Hinton et al. | |
| 2001/0037365 A1 | 11/2001 | Montague et al. | |
| 2002/0133720 A1 | 9/2002 | Sherman et al. | |
| 2002/0156905 A1 | 10/2002 | Weissman | |
| 2003/0005118 A1 | 1/2003 | Williams | |
| 2004/0030788 A1 | 2/2004 | Cimo et al. | |
| 2004/0049676 A1 | 3/2004 | Duterte et al. | |
| 2006/0136294 A1 * | 6/2006 | Linden et al. | 705/14 |
| 2007/0255821 A1 * | 11/2007 | Ge et al. | 709/224 |
| 2008/0115201 A1 | 5/2008 | Sturms et al. | |
| 2008/0229381 A1 * | 9/2008 | Sikka et al. | 726/1 |
| 2009/0064337 A1 | 3/2009 | Chien | |
| 2009/0077373 A1 | 3/2009 | Kramer | |
| 2010/0011215 A1 | 1/2010 | Lior et al. | |
| 2010/0088761 A1 | 4/2010 | Podjarny et al. | |
| 2011/0055391 A1 | 3/2011 | Schneider | |
| 2011/0225234 A1 | 9/2011 | Amit et al. | |
| 2012/0180128 A1 | 7/2012 | Amit et al. | |

OTHER PUBLICATIONS

Atwood, "Preventing CSRF and XSRF attack", Coding Horror, Oct. 14, 2008, p. 1-26.*
Yair Amit et al., U.S. Appl. No. 12/889,300, filed Sep. 23, 2010, Office Action, Nov. 8, 2012, 30 pages.
Yair Amit et al., U.S. Appl. No. 13/411,608, filed Mar. 4, 2012, Office Action, Nov. 9, 2012, 21 pages.

(Continued)

*Primary Examiner* — Venkat Perungavoor
*Assistant Examiner* — Amir Mehrmanesh
(74) *Attorney, Agent, or Firm* — Marcia L. Doubet

(57) ABSTRACT

Embodiments of the invention generally relate to thwarting fraud perpetrated with a computer by receiving a request from a computer to perform a transaction. Embodiments of the invention may include receiving the request together with transaction data and a cookie, where the transaction data are separate from the cookie; determining in accordance with predefined validation criteria whether the cookie includes a valid representation of the transaction data; and performing the transaction only if the cookie includes a valid representation of the transaction data.

19 Claims, 3 Drawing Sheets

(56) References Cited

OTHER PUBLICATIONS

Amit Klein "DOM Based Cross Site Scripting or XSS of the Third Kind," WASC Writeup (Jul. 2005), Web Application Security Consortium, retrieved from http://www.webappsec.org/projects/articles/071105.shtml on Jan. 12, 2009, 7pgs.

Balamurugan Prabakaran, et al., "Identifying Robust Defenses for Login CSRF" Department of Computer Science, University of Illinois, Chicago, 6pgs.

Adam Barth, et al. "Robust Defenses for Cross-Site Request Forgery," Proceedings of the 15th ACM Conference on Computer and Communications Security (2008), ACM, 13pgs.

Yair Amit et al., U.S. Appl. No. 13/411,608, filed Mar. 4, 2012, Office Action, Jun. 6, 2012, 14 pages.

Yair Amit et al., U.S. Appl. No. 12/889,300, filed Sep. 23, 2010, Office Action, Jul. 5, 2012, 22 pages.

Canadian Counterpart Application 2,694,326, Office Action dated Jan. 13, 2011 (3 pages).

* cited by examiner

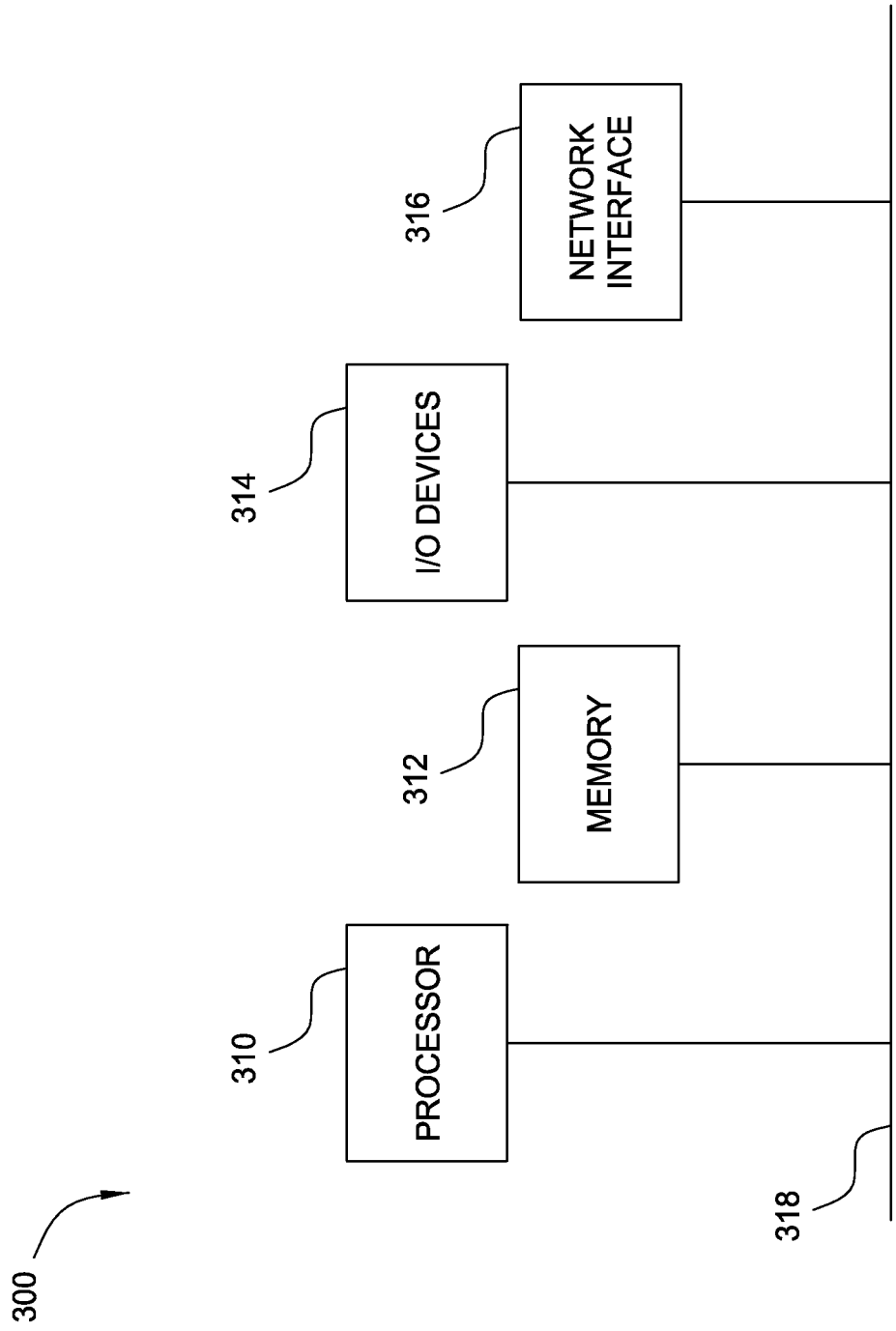

THWARTING CROSS-SITE REQUEST FORGERY (CSRF) AND CLICKJACKING ATTACKS

BACKGROUND

1. Field

Embodiments of the invention relate to computer software application security in general, and more particularly to thwarting Cross-Site Request Forgery (CSRF) and Clickjacking attacks.

2. Description of the Related Art

Cross-Site Request Forgery (CSRF) refers to a type of Internet-based fraud in which a party's web browser is caused to perform an unwanted action at a target web site. In a typical example of a CSRF attack, a bank customer using a web browser accesses a web site that typically does not belong to the customer's bank and that contains malicious instructions placed there by an attacker. The malicious instructions cause the bank customer's browser to send a transaction request to the customer's bank without the bank customer's knowledge, such as a request to transfer funds from the bank customer's bank account to the attacker's bank account.

Current methods for preventing CSRF attacks against users of a target web site include having the target web site server embed a randomly-generated nonce within web pages that are served by the target web server. An authenticated user who accesses the target web site receives the nonce and must return the same nonce to the target web server when sending a transaction request to the target web server. Assuming that such nonces cannot easily be forged or intercepted by an unauthorized party, a transaction request that is sent by the authenticated user's browser to the target web server as the result of a CSRF attack will most likely not include the proper nonce. This will be detected by the target web server, which will then defeat the CSRF attack.

One method used by CSRF attackers to overcome nonce-based anti-CSRF protection is referred to as "Clickjacking" and involves modifying a web page to include an IFRAME that points to a target web page on which a CSRF attack is to be perpetrated. A user who accesses the target web site with a browser causes the target web page to be retrieved along with its anti-CSRF nonce. The web page containing the IFRAME is configured to visually obscure the retrieved target web page but for a clickable button or link. The unsuspecting user is lured on a false pretext into entering information into the web page and clicking the button or link, whereupon the user's browser sends a transaction request to the target web server without the user's knowledge, thus carrying out the CSRF attack.

Current solutions for preventing Clickjacking attacks against authenticated users of a target web site include having the target web site server embed software instructions, such as in the form of a JavaScript™ routine, within web pages that are served by the target web server, where the embedded instructions cause the user's browser to check whether the target web page has been retrieved in the context of an IFRAME. Unfortunately, as this requires that the user's browser be configured to run such embedded instructions, a browser that is not so configured would still be vulnerable to a Clickjacking attack.

SUMMARY

In one aspect of the invention a method is provided for thwarting fraud perpetrated with a computer, the method including receiving a request from a computer to perform a transaction, where the request is received together with transaction data and a cookie, and where the transaction data are separate from the cookie, determining in accordance with predefined validation criteria whether the cookie includes a valid representation of the transaction data, and performing the transaction only if the cookie includes a valid representation of the transaction data.

In another aspect of the invention a method is provided for thwarting fraud perpetrated with a computer, the method including configuring a web page to include a set of instructions configured to create a cookie including a representation of transaction data, and configuring a web server to provide the web page to a computer responsive to a communication received from the computer, thereby causing the computer to perform the set of instructions, receive a request from the computer to perform a transaction, where the request is received together with the transaction data and the cookie, and where the transaction data are separate from the cookie, determine in accordance with predefined validation criteria whether the cookie includes a valid representation of the transaction data, and perform the transaction only if the cookie includes a valid representation of the transaction data.

In other aspects of the invention, systems and computer program products of the invention are provided.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 3 is a block diagram illustrating an exemplary hardware implementation of a computing system, constructed and operative in accordance with an embodiment of the invention.

DETAILED DESCRIPTION

Figure 1:
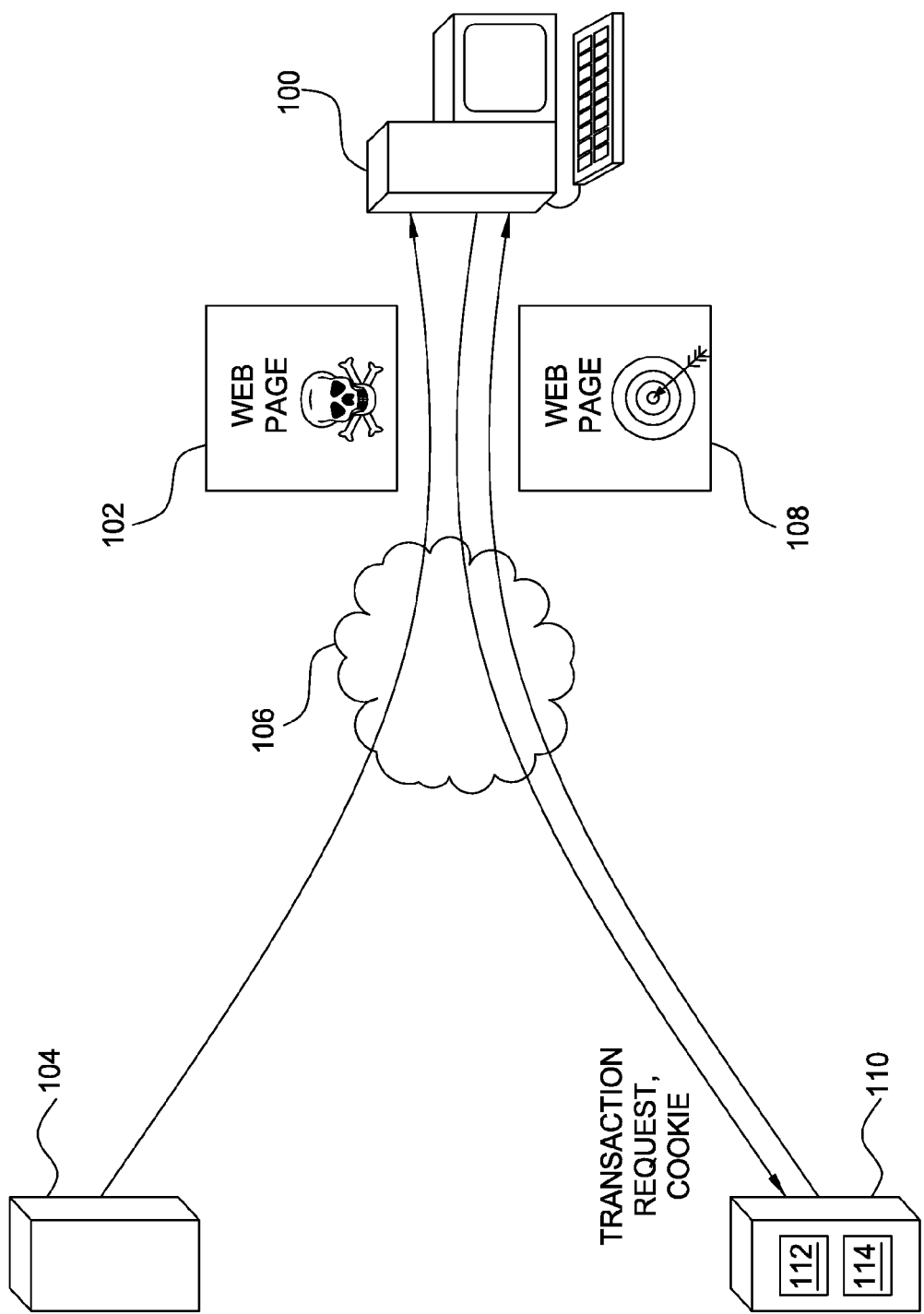
FIG. 1 is a conceptual illustration of a system for thwarting Cross-Site Request Forgery (CSRF) and Clickjacking attacks, constructed and operative in accordance with an embodiment of the invention.

The invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1 which is a conceptual illustration of a system for thwarting Cross-Site Request Forgery (CSRF) and Clickjacking attacks, constructed and operative in accordance with an embodiment of the invention. The system of FIG. 1 is described in the context of the following operational scenario where a computer user uses a web browser at a computer 100 to retrieve a web page 102 from a web server 104 via a computer network 106, such as the Internet. Unbeknownst to the user, web page 102 includes malicious instructions configured to implement a CSRF attack combined with a Clickjacking attack. Once loaded into the user's browser, the malicious instructions in web page 102 cause the user's browser to retrieve a web page 108 from a web server 110, and cause web page 108 to be visually obscured but for a clickable button or link in accordance with conventional Clickjacking techniques, such as by using an IFRAME. The malicious instructions in web page 102 also typically lure the user into entering malicious transaction data into web page 108. If the user is successfully lured into clicking on the exposed clickable button or link on web page 108, the user's browser sends the malicious transaction data to web server 110 as part of a transaction request.

In order to thwart the CSRF and Clickjacking attacks, web page 108 is preferably configured to include a set of instructions, such as JavaScript™ instructions, configured to determine, using conventional techniques, whether web page 108 is the target of a Clickjacking attack. The set of instructions are also configured to create a cookie including a representation of the transaction data input into web page 108 only if web page 108 is not the target of a Clickjacking attack. The representation may be derived from the transaction data in any known and predefined manner, such as a copy of some or all of the transaction data, which may be encrypted within the cookie, or may be a hash of some or all of the transaction data. A transaction processor 112 located at any of web server 110, the user's browser, and an intermediate actor such as an HTTP proxy, is preferably configured to receive the transaction request, typically when the transaction request is associated with the user who is authenticated with respect to web server 110, and to receive the transaction data along with the cookie as part of the transaction request, where the transaction data are separate from the cookie. A cookie validator 114 located at any of web server 110, the user's browser, and an intermediate actor such as an HTTP proxy, validates the cookie by determining, in accordance with predefined validation criteria, whether the cookie includes a valid representation of the transaction data, where the type of representation used is known in advance to cookie validator 114. Transaction processor 112 performs the requested transaction only if the cookie is determined in this manner to be valid.

In one embodiment, the system of FIG. 1 thus thwarts the CSRF and Clickjacking attacks described above as follows. If the user's browser is unable, or is not configured, to run the set of instructions included in web page 108, the user's browser will be unable to create the cookie including the representation of the transaction data. If the user is successfully lured into clicking on the exposed clickable button or link on web page 108, and the malicious transaction data is sent, such as to web server 110, as part of the transaction request, since the transaction request is not accompanied by the cookie including the representation of the transaction data, the recipient will not perform the requested transaction.

Further, in one embodiment, if the user's browser is able and configured to run the set of instructions included in web page 108, the user's browser will discover that web page 108 is the target of a Clickjacking attack, and the user's browser will be unable to create the cookie including the representation of the transaction data. Other conventional methods may additionally be used to defeat the Clickjacking attack, such as by preventing the transaction data from being sent, such as to web server 110, as part of the transaction request. Nevertheless, even if the malicious transaction data is sent as part of the transaction request, since the transaction request is not accompanied by the cookie including the representation of the transaction data, the recipient will not perform the requested transaction.

In one embodiment, the system of FIG. 1 may be used together with any other known anti-CSRF and anti-Clickjacking techniques, including the use of nonces, the use of unique, single-use codes included within the cookie to prevent replay attacks, and invalidating the cookie after a predefined period of time or when the server receives transaction requests by employing a Set-Cookie HTTP header. As used herein, a replay attack is a form of network attack in which a valid data transmission is maliciously or fraudulently repeated and/or delayed.

Figure 2:
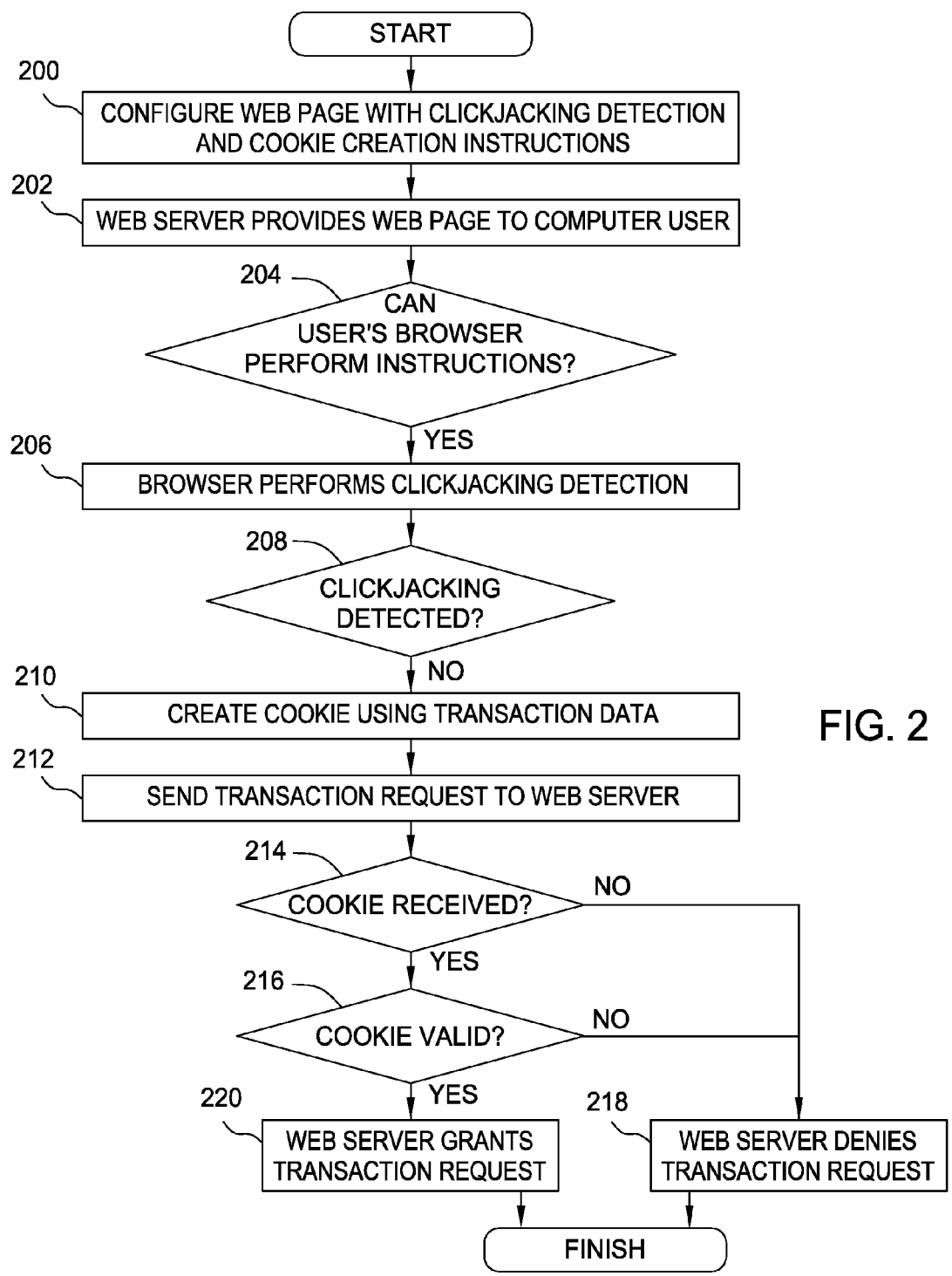
FIG. 2 is a flowchart illustration of an exemplary method of operation of the system of FIG. 1, operative in accordance with an embodiment of the invention.

Reference is now made to FIG. 2, which is a flowchart illustration of an exemplary method of operation of the system of FIG. 1, operative in accordance with an embodiment of the invention. In the method of FIG. 2, a web page at a web server is configured with clickjacking detection and cookie creation instructions (step 200). The web server provides the web page to a computer user's browser (step 202). If the user's browser is configured to perform the web page instructions (step 204), then the user's browser performs clickjacking detection (step 206). If no clickjacking attack is detected (step 208) the computer user's browser creates a cookie using transaction data within the web page (step 210), where the cookie includes a representation of the transaction data. The user's computer sends a transaction request, including the transaction data and the cookie, to a web server (step 212). When the web server receives the transaction request, if the transaction request arrives without a cookie (step 214), or if a cookie is received, but the cookie does not contain a valid representation of the transaction data (step 216), the web server does not grant the transaction request (step 218). If a cookie is received and contains a valid representation of the transaction data, the web server grants the transaction request (step 220).

Alternatively, in one embodiment, the user's browser does not perform clickjacking detection (step 206), and the cookie's creation is therefore not predicated on no clickjacking attack being detected. It will be appreciated that even if clickjacking detection is not performed, the invention is still effective against CSRF attacks where Clickjacking is not used by an attacker, and where an attacker is unable to hijack or reproduce the cookie creation instructions to create a cookie that can be validated as described above.

The system and method of FIGS. 1 and 2 may be understood within the context of the following exemplary JavaScript™ implementation, including sample pseudocode and code files "CSRFProtection.js" and "CSRFProtection.cs":

Pseudocode:

1. JavaScript™ code is added to one or more web pages served to the user's browser by a web application at a web server.

At the user's browser:

1.1 JavaScript™ code verifies that the web page is not within an IFRAME.

1.2 JavaScript™ code hooks into the web page form's onsubmit event with the signRequest function.

1.3 If AJAX support is needed, JavaScript™ code may hook XmlHttpRequest to call the signRequest function before performing its action.

1.4 When called, signRequest adds a cookie to the Document Object Model (DOM) named 'RequestSignature', including some or all of the transaction data or their hash value. DOM refers to a cross-platform and language-independent convention for representing and interacting with objects in documents formatted using a markup language, such as HTML, XHTML, XML, etc.

1.5 When the user performs an action on the web page in the user's browser (such as clicking on a widget on the web page), the signRequest function is called.

1.6 The transaction request is sent to the web server together with the RequestSignature cookie.

2. The web server validates the request as follows:

2.1 Check whether the request includes the RequestSignature cookie.

2.1.1 If the request does not include the RequestSignature cookie, the request is considered to be bogus, and processing of the transaction request is terminated.

2.2. Validate that the RequestSignature cookie properly includes the transaction data or hash value.

2.2.1 If the RequestSignature cookie does not properly include the transaction data or hash value, the request is considered to be bogus, and processing of the transaction request is terminated.

2.2.2 Otherwise, the request is considered to be genuine. The RequestSignature cookie is deleted and the transaction is processed. The cookie may be deleted from the user's browser. The cookie may also be kept on the web server temporarily to thwart replay attacks subsequent to validation of the request.

```
----------------------------------------------------------
CSRFProtection.js
// JScript File
function setCookie(c_name,value,expiredays)
{
    var exdate=new Date( );
    exdate.setDate(exdate.getDate( )+expiredays);
    document.cookie=c_name+ "=" +escape(value)+";path=/";
}
function antiClickjacking( )
{
    // frame busting implementation
    // There are other known techniques to implement this
    if (top != self)
    {
        document.location.href="ClickjackingDetected.htm";
    }
}
function signRequest(form)
{
    var values = "CSRFProtectionTime=" + new Date( ).getTime( ) + ";";
    for (i=0; i<form.elements.length; i++)
    {
        var pair = encodeURIComponent(form.elements[i].name) + "=" +
encodeURIComponent(form.elements[i].value);
        values= values + pair + ";";
    }
    setCookie("RequestSignature", values);
}
function hookOnSubmit( )
{
    for (i=0; i < document.forms.length; i++)
    {
        var form = document.forms[i];
        document.forms[i].onsubmit=function ( ) { signRequest(form); return true; };
    }
}
function CSRFProtection( )
{
    antiClickjacking( );
    hookOnSubmit( );
}
window.onload = CSRFProtection;
----------------------------------------------------------
CSRFProtection.cs
using System;
using System.Data;
using System.Configuration;
using System.Web;
using System.Web.Security;
using System.Web.UI;
using System.Web.UI.WebControls;
using System.Web.UI.WebControls.WebParts;
using System.Web.UI.HtmlControls;
using System.Collections.Generic;
/// <summary>
/// Summary description for CSRFProtection
/// </summary>
public class CSRFProtection
{
    private HttpContext context;
    private HttpRequest request;
    private HttpResponse response;
    enum ValidateRequestResult { NO_COOKIE, BAD_VALUES, REPLAY, OK } ;
    public CSRFProtection(HttpContext context)
    {
        this.context = context;
        if (null == context.Application["RequestSetAntiReplay"])
        {
            context.Application["RequestSetAntiReplay"] = new HashSet<int>( );
        }
    }
    public static bool Validate(HttpContext context)
    {
        CSRFProtection csrfProtection = new CSRFProtection(context);
        return csrfProtection.Validate( );
    }
    public bool Validate( )
    {
        this.response = context.Response;
        this.request = context.Request;
```

```
      bool bRes = false;
      switch (ValidateRequest( ))
      {
        case ValidateRequestResult.OK:
           RemoveSignatureCookie( );
           bRes = true;
           break;
        case ValidateRequestResult.BAD_VALUES:
           RemoveSignatureCookie( );
           break;
        case ValidateRequestResult.REPLAY:
           RemoveSignatureCookie( );
           break;
        case ValidateRequestResult.NO_COOKIE:
           break;
      }
      return bRes;
    }
    private IDictionary<String, String> ParseRequestSignature(String signature)
    {
      signature = context.Server.UrlDecode(signature);
      IDictionary<String, String> res = new Dictionary<String, String>( );
      string[ ] tokens = signature.Split(new char[ ] { ';' });
      foreach (String token in tokens)
      {
        if ("" == token)
        {
           continue;
        }
        String[ ] nameVal = token.Split(new char[ ] { '=' });
        if (nameVal.Length != 2)
        {
           return null;
        }
        String name = context.Server.UrlDecode(nameVal[0]);
        String value = context.Server.UrlDecode(nameVal[1]);
        res[name] = value;
      }
      return res;
    }
    private ValidateRequestResult ValidateRequest( )
    {
      HttpCookie signature = request.Cookies.Get("RequestSignature);
      HashSet<int> antiReplaySet =
(HashSet<int>)(context.Application["RequestSetAntiReplay"]);
      if (null == signature)
      {
        return ValidateRequestResult.NO_COOKIE;
      }
      IDictionary<String, String> sig = ParseRequestSignature(signature.Value);
      int sigHash = signature.Value.GetHashCode( );
      if (antiReplaySet.Contains(sigHash))
      {
        return ValidateRequestResult.REPLAY;
      }
      foreach (String param in request.Form)
      {
        if (!sig.ContainsKey(param))
        {
           return ValidateRequestResult.BAD_VALUES;
        }
        if (sig[param] != request.Form[param])
        {
           return ValidateRequestResult.BAD_VALUES;
        }
      }
      // TODO: add mechanism to empty bucket
      antiReplaySet.Add(sigHash);
      return ValidateRequestResult.OK;
    }
    private void RemoveSignatureCookie( )
    {
      HttpCookie signature = new HttpCookie("RequestSignature");
      signature.Expires = DateTime.Now.AddDays(-1D);
      response.Cookies.Add(signature);
    }
  }
```

The following is an exemplary C# web application that implements the invention as described hereinabove:

```
-----------------------------------------------------------
<%@ Page Language="C#" EnableEventValidation="true"
AutoEventWireup="true" CodeFile="Default.aspx.cs"
Inherits="CSRFProtectedApp" %>
<!DOCTYPE html PUBLIC "-//W3C//DTD XHTML 1.1//EN"
"http://www.w3.org/TR/xhtml11/DTD/xhtml11.dtd">
<html xmlns="http://www.w3.org/1999/xhtml">
<head runat="server">
   <title>Untitled Page</title>
   <script src="CSRFProtection.js"> </script>
</head>
<body>
   <form id= "form1" method="get" runat="server">
      <asp:ScriptManager ID="ScriptManager1" runat="server" />
      <div>
         <asp:TextBox ID="TextBox1" runat="server">
         </asp:TextBox>
         <asp:Button ID= "Button1" runat= "server" Text= "Button"
OnClick="Button1_Click" /> </div>
      </form>
</body>
</html>
-----------------------------------------------------------
public partial class CSRFProtectedApp : System.Web.UI.Page
{
   protected void Button1_Click(object sender, EventArgs e)
   {
      if (!CSRFProtection.Validate(this.Context))
      {
         Response.Write("attack detected");
         return;
      }
      Response.Write("valid action!");
   }
}
-----------------------------------------------------------
```

Referring now to FIG. 3, block diagram 300 illustrates an exemplary hardware implementation of a computing system in accordance with which one or more components/methodologies of the invention (e.g., components/methodologies described in the context of the drawing figures shown and described herein) may be implemented, according to an embodiment of the invention.

As shown, the techniques for controlling access to at least one resource may be implemented in accordance with a processor 310, a memory 312, I/O devices 314, and a network interface 316, coupled via a computer bus 318 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the methods and apparatus herein may or may not have been described with reference to specific computer hardware or software, it is appreciated that the methods and apparatus described herein may be readily implemented in computer hardware or software using conventional techniques.

Furthermore, while the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method for thwarting fraud perpetrated with a computer, the method comprising:

receiving a request from a computer to perform a transaction, wherein the request is received together with transaction data for carrying out the transaction and a cookie created from the transaction data, and wherein the transaction data are entered by a user on a web page from which the request is sent from the computer and are separate, in the request, from the cookie, the web page configured with a predefined set of executable instructions that operate to determine whether the computer is a target of a clickjacking attack and if so, to suppress creation of the cookie;

by operation of one or more computer processors, determining in accordance with predefined validation criteria whether the cookie, when present, includes a valid representation of the transaction data; and performing the transaction only if the cookie is present and includes a valid representation of the transaction data.

2. The method of claim 1, wherein the predefined set of executable instructions determines whether the computer is a target of a clickjacking attack by determining whether the web page has been retrieved in a context of an IFrame.

3. The method of claim 1, wherein the predefined set of executable instructions operates to cause the computer to transmit the request only if the predefined set of executable instructions determine that the computer is not a target of a clickjacking attack.

4. The method of claim 1, wherein the predefined set of instructions operates to determine whether the computer is a target of a clickjacking attack responsive to receiving the entered transaction data from the user.

5. The method of claim 1, wherein the predefined set of instructions operates to determine whether the computer is a target of a clickjacking attack responsive to loading the web page for displaying with a browser of the computer.

6. The method of claim 1, wherein the predefined set of executable instructions determines whether the computer is a target of a clickjacking attack by determining whether the web page has been retrieved in a context of a top-level window of a graphical user interface on which the web page is rendered.

7. A method for thwarting fraud perpetrated with a computer, the method comprising:

configuring a web page to include a set of instructions configured to determine whether the web page, when rendered by a computer, is a target of a clickjacking attack and if not, to create a cookie including a representation of transaction data entered, by a user, on the rendered web page for carrying out a transaction; and configuring a web server to:

provide the web page to the computer responsive to a communication received from the computer, thereby causing the computer to perform the set of instructions;

receive a request from the computer to perform the transaction, wherein the request is received from the computer together with the transaction data and, when the set of instructions determines that the web page is not the target of the clickjacking attack, the cookie, and wherein the transaction data are separate, in the request, from the cookie when the cookie is also received;

by operation of one or more computer processors, determine in accordance with predefined validation criteria whether the cookie, when received, includes a valid representation of the transaction data; and perform the transaction only if the cookie is received and includes a valid representation of the transaction data.

8. The method of claim 7, wherein the set of instructions is configured to determine whether the web page is the target of the clickjacking attack by determining whether the web page has been retrieved in a context of an IFrame.

9. The method of claim 7, wherein the set of instructions is further configured to cause the computer to transmit the request to the web server only if the set of instructions determines that the web page is not the target of the clickjacking attack.

10. The method of claim 7, wherein the set of instructions operates to determine whether the web page is the target of the clickjacking attack responsive to receiving the entered transaction data from the user.

11. The method of claim 7, wherein the set of instructions operates to determine whether the web page is the target of the clickjacking attack responsive to loading the web page for the rendering by the computer.

12. The method of claim 7, wherein the causing the computer to perform the set of instructions comprises performing the set of instructions upon the rendering of the web page by the computer.

13. A system for thwarting fraud perpetrated with a computer, the system comprising:

a transaction processor configured to receive a request from a computer to perform a transaction, wherein the request is received together with transaction data for carrying out the transaction and a cookie created from the transaction data, and wherein the transaction data are entered by a user on a web page from which the request is sent from the computer and are separate, in the request, from the cookie, the web page configured with a predefined set of executable instructions that operate to determine whether the computer is a target of a clickjacking attack and if so, to suppress creation of the cookie;

a cookie validator configured to determine in accordance with predefined validation criteria whether the cookie, when present, includes a valid representation of the transaction data;

wherein the transaction processor is configured to perform the transaction only if the cookie is present and includes a valid representation of the transaction data.

14. The system of claim 13, wherein the predefined set of executable instructions determines whether the computer is a target of a clickjacking attack by determining whether the web page has been retrieved in a context of an IFrame.

15. The system of claim 13, wherein the predefined set of executable instructions operates to cause the computer to transmit the request only if the predefined set of executable instructions determine that the computer is not a target of a clickjacking attack.

16. A system for thwarting fraud perpetrated with a computer, the system comprising:

a web page configured to include a set of instructions configured to determine whether the web page, when rendered by a computer, is a target of a clickjacking attack and if not, to create a cookie including a representation of transaction data entered, by a user, on the rendered web page for carrying out a transaction; and a web server configured to:

provide the web page to the computer responsive to a communication received from the computer, thereby causing the computer to perform the set of instructions;

receive a request from the computer to perform the transaction, wherein the request is received from the computer together with the transaction data and, when the set of instructions determines that the web page is not the target of the clickjacking attack, the cookie, and wherein the transaction data are separate, in the request, from the cookie when the cookie is also received;

determine in accordance with predefined validation criteria whether the cookie, when received, includes a valid representation of the transaction data; and perform the transaction only if the cookie is received and includes a valid representation of the transaction data.

17. The system of claim 16, wherein the set of instructions is configured to determine whether the web page is the target of the clickjacking attack by determining whether the web page has been retrieved in a context of an IFrame.

18. The system of claim 16, wherein the set of instructions is further configured to cause the computer to transmit the request to the web server only if the set of instructions determines that the web page is not the target of the clickjacking attack.

19. A computer program product for thwarting fraud perpetrated with a computer, the computer program product comprising:

a non-transitory computer-readable storage medium; and computer-readable program code embodied in the computer-readable storage medium, wherein the computer-readable program code is configured to:

receive a request from a computer to perform a transaction, wherein the request is received together with transaction data for carrying out the transaction and a cookie created from the transaction data, and wherein the transaction data are entered by a user on a web page from which the request is sent from the computer and are separate, in the request, from the cookie, the web page configured with a predefined set of executable instructions that operate to determine whether the computer is a target of a clickjacking attack and if so, to suppress creation of the cookie;

determine in accordance with predefined validation criteria whether the cookie, when present, includes a valid representation of the transaction data; and perform the transaction only if the cookie is present and includes a valid representation of the transaction data.

* * * * *